(12) United States Patent
Lasagni et al.

(10) Patent No.: US 9,370,843 B2
(45) Date of Patent: Jun. 21, 2016

(54) DEVICE, ARRANGEMENT, AND METHOD FOR THE INTERFERENCE STRUCTURING OF PLANAR SAMPLES

(75) Inventors: Andrés Fabián Lasagni, Dresden (DE); Eckhard Bever, Dresden (DE); Teja Roch, Dresden (DE)

(73) Assignee: Fraunhofer-Gesellschaft zur Förderung der angewandten Forschung e. V. (DE)

( * ) Notice: Subject to any disclaimer, the term of this patent is extended or adjusted under 35 U.S.C. 154(b) by 424 days.

(21) Appl. No.: 13/984,731

(22) PCT Filed: Feb. 9, 2012

(86) PCT No.: PCT/EP2012/052244
§ 371 (c)(1),
(2), (4) Date: Sep. 11, 2013

(87) PCT Pub. No.: WO2012/107535
PCT Pub. Date: Aug. 16, 2012

(65) Prior Publication Data
US 2014/0291308 A1  Oct. 2, 2014

(30) Foreign Application Priority Data
Feb. 10, 2011  (DE) .......................... 10 2011 011 734

(51) Int. Cl.
*B23K 26/00* (2014.01)
*B23K 26/352* (2014.01)
(Continued)

(52) U.S. Cl.
CPC ............... *B23K 26/067* (2013.01); *B23K 26/00* (2013.01); *B23K 26/0084* (2013.01);
(Continued)

(58) Field of Classification Search
CPC ...... B23K 26/00; B23K 26/352; G02B 26/00; G02B 27/00
USPC ................... 219/121.75; 369/112.03–112.14, 369/112.23–112.26
See application file for complete search history.

(56) References Cited

U.S. PATENT DOCUMENTS 5,072,091 A   12/1991  Nagata et al.
6,549,309 B1  4/2003   Monaghan et al.
(Continued)

FOREIGN PATENT DOCUMENTS

DE   102005024086 A1   12/2005
EP        1586405 A1   10/2005
JP     2003-307700 A   10/2003

OTHER PUBLICATIONS

"International Application No. PCT/EP2012/052244, International Search Report mailed May 7, 2012", 6 pgs.

(Continued)

*Primary Examiner* — Samuel M Heinrich
(74) *Attorney, Agent, or Firm* — Schwegman, Lundberg & Woessner, P.A.

(57) ABSTRACT

The invention relates to a device (and a corresponding method) for the interference structuring of a planar sample, comprising a laser, a focusing element, which is arranged in the beam path of the laser and by means of which the laser radiation can be focused in a first spatial direction, a first prism, in particular a biprism, which is arranged in the beam path of the laser and by means of which the laser radiation can be directed at a sample volume in a second spatial direction preferably perpendicular to the first spatial direction by means of two beams, in such a way that the two beams interfere within the sample volume in an interference area, the sample volume, in which the planar sample is or can be placed in the interference area, and a moving unit, by means of which the beam(s) of the laser radiation can be moved in the first, the second, or the first and second spatial directions and/or by means of which a/the sample can be moved in the sample volume in the first, the second, or the first and second spatial directions.

19 Claims, 13 Drawing Sheets

Figure 1A:
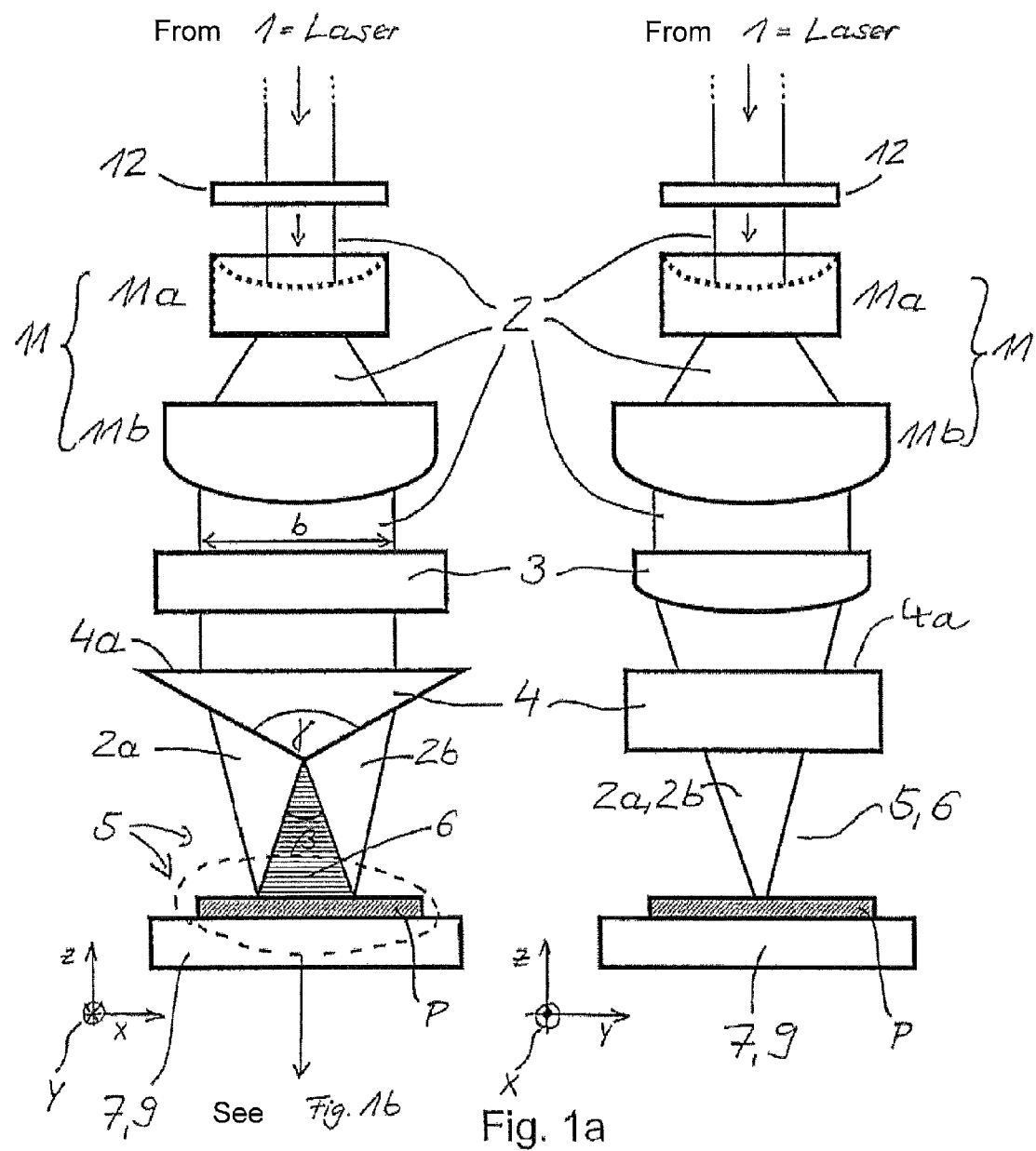

(51) Int. Cl.
    *G02B 26/00*     (2006.01)
    *G02B 27/00*     (2006.01)
    *B23K 26/067*     (2006.01)
    *B23K 26/073*     (2006.01)
    *B23K 26/06*     (2014.01)
    *B23K 26/08*     (2014.01)
    *G03H 1/04*     (2006.01)

(52) U.S. Cl.
    CPC ........ *B23K 26/0648* (2013.01); *B23K 26/0676* (2013.01); *B23K 26/0738* (2013.01); *B23K 26/083* (2013.01); *B23K 26/0815* (2013.01); *B23K 26/0821* (2015.10); *B23K 26/0823* (2013.01); *B23K 26/352* (2015.10); *G02B 26/00* (2013.01); *G02B 27/00* (2013.01); *G03H 2001/0482* (2013.01)

(56) References Cited

U.S. PATENT DOCUMENTS

| | | | |
|---|---|---|---|
| 7,359,102 B2 | 4/2008 | Tanioka | |
| 8,958,669 B2* | 2/2015 | Plain | G02B 6/04 385/15 |
| 2003/0035219 A1 | 2/2003 | Tanaka | |
| 2003/0183152 A1* | 10/2003 | Shafeev | G02B 6/13 117/4 |

OTHER PUBLICATIONS

"International Application No. PCT/EP2012/052244, Written Opinion mailed May 7, 2012", (w/ English Translation), 10 pgs.

"International Application PCT/EP2012/052244, International Preliminary Report on Patentability dated Aug. 13, 2013", (w/ English Translation), (Aug. 13, 2013), 12 pgs.

* cited by examiner

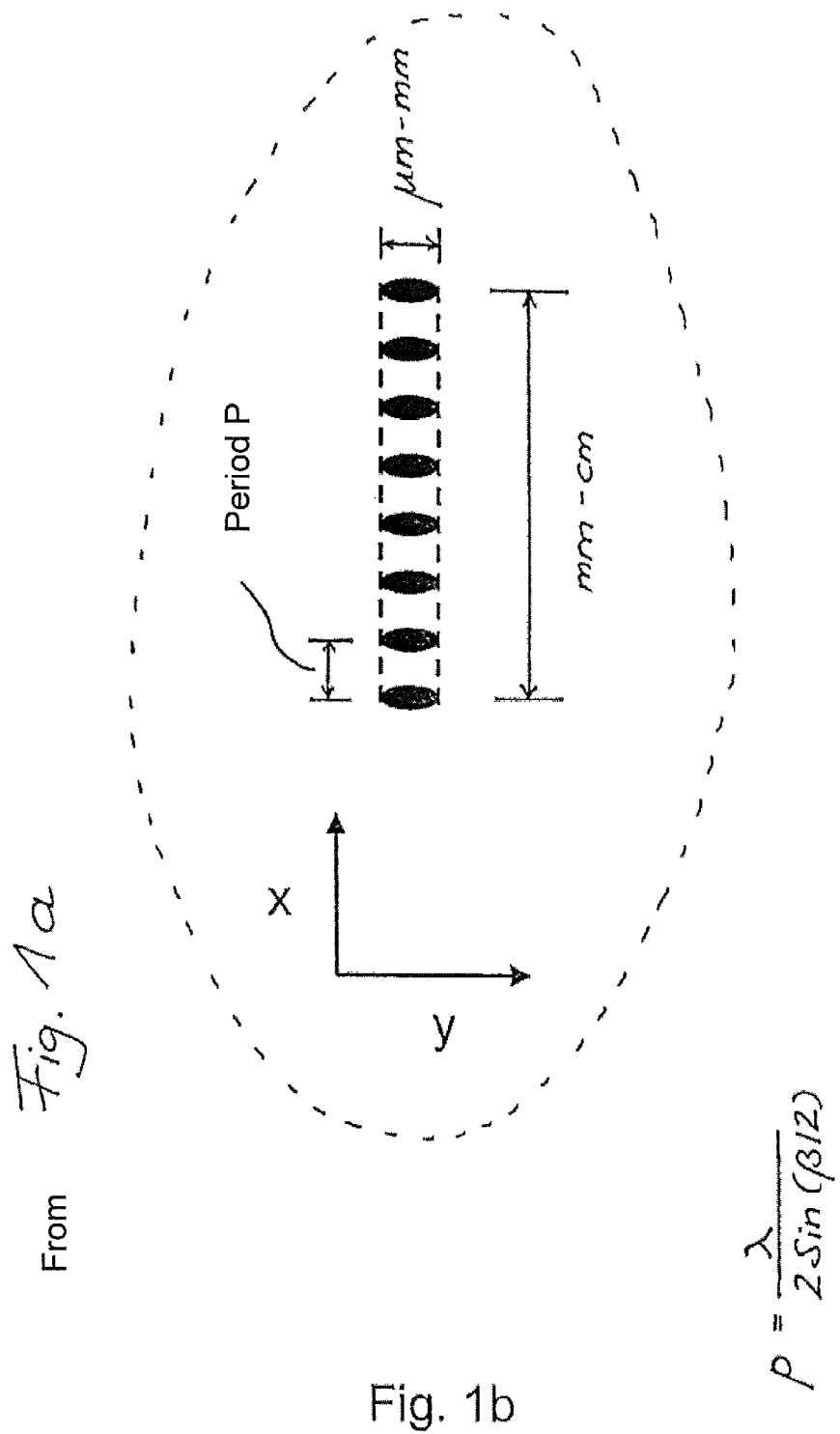

e) Robot f) Roller-to-roller

| Repetition rate of the pulses Wr [KHz] | Pulse energy [mJ] | Focal size Length in x [mm] | Focal size Length in y [µm] | Fluence [J/cm²] | Scan speed [m/s] At 0% overlap | Maximum speed of the pattern introduction [m²/min] At 0% overlap |
|---|---|---|---|---|---|---|
| 10 | 50 | 13 | 400 | 1,0 | 4 | 3,12 |
| 20 | 10 | 10 | 100 | 1,0 | 2 | 1,2 |
| 50 | 2 | 5 | 40 | 1,0 | 2 | 1,7 |
| 10 | 100 | 250 | 40 | 1,0 | 0,4 | 6 |

Fig. 9

DEVICE, ARRANGEMENT, AND METHOD FOR THE INTERFERENCE STRUCTURING OF PLANAR SAMPLES

PRIORITY CLAIM TO RELATED APPLICATIONS

This application is a national stage application under 35 U.S.C. §371 of PCT/EP2012/052244, filed Feb. 9, 2012, and published as WO 2012/107535 A1 on Aug. 16, 2012, which claims priority to German Application No. 10 2011 011 734.2, filed Feb. 10, 2011, which applications and publication are incorporated by reference as if reproduced herein and made a part hereof in their entirety, and the benefit of priority of each of which is claimed herein.

The present invention relates to the structuring of planar samples using laser systems, in particular using fiber lasers or laser systems having a high pulse frequency.

It is known from the prior art (U.S. Pat. No. 6,549,309 B1) to use a beam splitter structure for introducing an interference pattern, said beam splitter structure combining a beam splitter with a plurality of deflection mirrors such that the radiation of a laser is irradiated onto the sample to be structured from different directions. The beam portions incident from different directions generate interferences in the sample region so that a corresponding structuring of the sample can hereby take place.

The use of diffractive optical elements (grids) is likewise known from the prior art to effect an interference structuring of samples.

The apparatus known from the prior art in particular have the disadvantage that laser systems having a high pulse energy are necessary for the structuring of the materials or samples. Laser systems having a high pulse frequency (repetition rate) and low pulse energies are therefore not suitable. In addition, the surface which can be structured per time unit is limited as a rule in the known apparatus.

It is therefore the object of the present invention, starting from the prior art, to provide apparatus and methods for the laser interference structuring of planar samples with which planar samples can be structured simply, reliably, with a clear increase in the processing speed and also while using laser systems having high pulse frequencies and low pulse energies.

This object is achieved by an apparatus in accordance with claim 1, by an arrangement in accordance with claim 13 as well as by a method in accordance with claim 14. Advantageous embodiments of the apparatus, of the arrangement and of the method can be seen from the respective claims.

The present invention will first be described generally in the following and then in detail with reference to a plurality of embodiments. The features shown in combination with one another in the individual embodiments, however, do not have to be realized within the framework of the present invention in exactly the combinations occurring in the embodiments, but can rather also be realized in a different manner. Individual ones of the features shown in the embodiments can in particular also be omitted or be arranged differently.

The basic idea of the solution in accordance with the invention is based on a combination of different optical elements (prism, in particular biprism and focusing element, in particular cylindrical lens) with a movement and/or with a deflection of the laser beam and/or of the planar sample to be structured. The individual optical elements (e.g. the focusing element) can in this respect, as is described in detail in the following, in turn themselves be composed of a plurality of individual parts (lenses or the like), that is in a multipart manner. Galvanometer scanners or movement units which have beam deflection elements (in particular mirrors), which can be positioned by means of a galvanometer drive, can be used to particular advantage for moving the laser beam. The control of beam deflection elements with the aid of galvanometer drives is already known from the prior art (DE 10 2005 024 086 A1 or JP 2003-307700 A) so that a description of the details of such a drive for beam deflection elements will be dispensed with.

An apparatus in accordance with the invention for the interference structuring of a planar sample has a laser and, in the beam path after this laser, a focusing element configured for focusing the laser radiation. The focusing unit focuses the laser radiation in only one spatial direction, but without focusing the laser radiation in the direction perpendicular to this spatial direction. In particular a cylindrical lens can be used as the focusing element. A prism (in the following: a first prism) is likewise arranged in the beam path of the laser (preferably a biprism), with which the laser radiation in a second spatial direction, which does not coincide with the first spatial direction, therefore has an angle≠0° to it and which is preferably orthogonal to the first spatial direction, is directed with two beams onto a sample volume such that these two beams interfere in an interference region within the sample volume. The planar sample or the surface to be structured of the planar sample is then arranged in the interference region of the sample volume. Finally, the apparatus comprises a movement unit with which the laser radiation can be moved in at least the first or second spatial direction, but preferably in the first and second spatial directions, to structure a predefined surface section of the sample to be processed in the interference region by the interference maxima of the laser radiation. Alternatively to this (or also in combination therewith), the movement unit can also be configured so that the sample and/or the sample volume (together with the sample) can be moved into the first spatial direction, in the second spatial direction or into the first and second spatial directions.

So that a material removal, a material fusion, a phase conversion or local changes in the chemical properties (that is the structuring of the sample) can take place in the region of the interference maxima of the laser radiation in the sample volume, the energy density of laser radiation present in these maxima at the location of the sample has to be selected suitable, e.g. between 0.1 and 10 J/cm2. This can be realized by suitable selection of the laser and of the focusing element (achieving a focus size in the direction of the first spatial direction which is as small as possible).

In a particularly preferred embodiment variant, the movement unit in accordance with the invention is configured on the basis of a galvanometer scanner: The movement unit in this respect comprises one or more movable beam deflection elements arranged in the beam path of the laser. The beam deflection elements—in particular mirrors or also reflecting prisms—are configured as rotational or pivotable and are arranged such that the laser radiation (or the beams thereof) is movable in at least one of the two aforesaid spatial directions. The exact positioning or angular setting of the individual beam deflection elements thus takes place using a galvanometer drive. The beam deflection elements in the beam path of the laser are preferably arranged before the focusing element and before the first prism are can be controlled (by the drive) such that the angle of incidence and/or the position of incidence of the laser radiation on the optical elements following the beam deflection elements, that is the beam path, can be varied. The incidence of the laser radiation on the focusing element or on the first prism (or on an optical element such as a collimator or a beam expander which is arranged before the focusing element and the first prism, but after the deflection element) can be designed such that the incident laser radiation sweeps over a predefined surface by the drive of the beam deflection elements. If the angle of incidence and/or position of incidence of the incident radiation is thus varied on the side of incidence, a shift (migration) of the interference region on the exit side (after the focusing element and the first prism) results accordingly so that a predefined surface region of the sample can be structured by material removal (material fusing, etc.), in the region of the migrating interference maxima.

The beam deflection elements, however, do not have to be arranged in the beam path in front of the focusing element and in front of the first prism. An arrangement is thus also conceivable in which first a biprism and then a two-part focusing element comprising a cylindrical lens and an F-theta objective follow in the beam path, wherein one or more beam deflection elements are then arranged between the cylindrical lens and the F-theta objective of the focusing element. A single-part F-theta objective which only focuses the beam in one spatial direction (cylindrical F-theta objective) and simultaneously ensures that the laser beam focus lies in one and the same plane (surface of the sample) over the total scannable region (scan field) can also be used instead of a cylindrical lens.

Alternatively to this (or in combination therewith), the movement unit on the beam exit side can also have a movable displacement unit. The latter can be a rotatable table, an x-y displacement table or also a belt-based roller-to-roller transport unit. The displacement unit is in this respect configured such that the sample volume (or the sample arranged therein) is displaceable by translation and/or by rotation in the plane of the first and second spatial directions. The displacement unit (e.g. the displacement table) is particularly preferably configured such that the sample can also additionally be displaced by it perpendicular to the plane of the first and second spatial directions.

Rotatable rotary units (e.g. cylindrical rolls) on whose surface the sample can be arranged can also be used as a movement unit. A cylindrical roll is thus conceivable on whose jacket surface the sample is spanned and which is rotated about a rotational axis in the plane of the first and second spatial directions. A structuring of the sample along the jacket surface then takes place by rotation of this jacket surface in the interference region.

In accordance with the invention, the focusing element can be arranged in front of the first prism in the beam path (in this case, the focusing takes place first and then the splitting of the laser beam path into the two beams interfering in the interference region). Alternatively to this, however, the converse arrangement in the beam path is also possible.

A beam expander is preferably arranged in front of the focusing element and in front of the first prism in the beam path of the laser. The beam expander can, however, also be arranged before the beam deflection element(s) or the galvanoscanner. The beam expander preferably comprises a concave lens followed by a convex lens. The converse arrangement is also possible, however (the beam becomes smaller), which is necessary when the raw beam is too large. Beam expanders with two convex lenses are also possible. The beam expander can be configured so that the expanding of the laser radiation (or of the beam(s)) only takes place in the second spatial direction, but not in the first spatial direction. Collimators can also be used in the beam path (preferably before the focusing element and before the first prism) for generating sufficiently parallel beam paths.

In a further advantageous embodiment variant, the apparatus in accordance with the invention comprises a further second prism in the beam path. This prism is also preferably a biprism. This second prism splits the laser radiation into two beams such that these beams are already separated from one another before they then are finally incident on the optical element (in particular the first prism) following the second prism. The beams thus separated are then brought into interference in the sample volume by the first prism as described above. The second prism can be arranged before the first prism and the latter can be arranged before the focusing element. It is, however, equally conceivable to arrange the second prism before the focusing element and the latter in turn before the first prism.

The laser used can in particular be a pulsed laser (particularly preferably a pulsed fiber laser) whose pulse time lies in the range between 0.01 and 500 ns, preferably between 6 and 50 ns. The pulse repetition rate of the pulsed laser advantageously lies in the kilohertz range, preferably between 0.1 and 50 kHz. Lasers having wavelengths in the infrared range (e.g. at 1064 nm) can be used as can lasers in the UV range or in the visible range (e.g. at 532 nm).

Further optical elements can also be arranged in the beam path (preferably before the focusing element and before the first prism): Frequency multipliers, acousto-optical modulators, mechanical shutters, beam homogenizers and/or polarizers. A beam homogenizer used in is in this respect advantageously configured for producing a flat intensity section (a so-called "top flat" section).

The frequency multiplier is preferably arranged as a first optical element (or also after the collimator) and allows a halving or division into thirds or quarters of the laser wavelength. This can increase the coupling or also the absorption of the laser radiation in certain materials. The acousto-optical modulator or also the mechanical shutter (preferably arranged after the collimator or the frequency multiplier) enable the use of individual laser pulses or also allow the number of laser pulses to be monitored.

The use of the polarizer (preferably arranged after the frequency multiplier) is advantageous for the improved laser beam coupling, e.g. into metals.

In a particularly advantageous embodiment, the above-described apparatus in accordance with the invention is used within the framework of an arrangement for interference structuring which has a base arranged in fixed position in the global coordinate system and a kinematic unit connected to the base and movable relative to the base by one of its ends. In this respect, it can be an industrial robot whose base frame forms the base and whose kinematic chain is used as the kinematic unit. The apparatus in accordance with the invention for interference structuring is then fastened to the movable end of the kinematic unit (with the apparatus preferably being configured as rigid relative to the end member of the kinematic unit or chain).

The apparatus in accordance with the invention has a series of important advantages with respect to the apparatus for interference structuring known from the prior art:

In accordance with the invention, the design of a compact optical system for producing one-dimensional or two-dimensional interference patterns can be accomplished for the direct structuring of the most varied sample materials. The invention is in this respect in particular characterized by a clear increase in the processing speed in the structuring of surfaces and also by a comparatively simple design. Large surfaces can also be structured fast using the present invention.

In this respect, the variant of the galvanometer-based movement unit in accordance with the invention is particularly advantageous. Table movements in the range of some meters per second would be necessary (which would be difficult to achieve mechanically) for a fast structuring of planar samples in two dimensions. However, a large displacement of the interference pattern or of the beam focus and thus a fast sweeping over of a sufficiently large surface can be achieved by a suitable arrangement and suitable distances of the beam deflection elements even with small angle changes in the position of the beam deflection elements at the output side (that is in the region of the sample volume). Fast movements of large masses (table mass) can therefore be completely avoided in accordance with the invention. Extremely high structuring speeds paired with very fast beam deflections (and thus high surface processing speeds) are thus possible particularly in this embodiment.

A special advantage is furthermore that with a continuously moved sample the laser beam can be positioned on the sample surface independently of the sample movement. It is thus possible, for example, to irradiate a sample position a multiple of times (using a plurality of laser pulses) before the position of the irradiation changes.

The present invention allows a very variable arrangement and orientation of the different optical elements (prism, cylindrical lens, . . . ) in the laser beam path so that an exact and reproducible focusing in the sample volume is possible (the expansion of the beam in the interference region in the first spatial direction amounts to between 10 and 500 μm and in the second spatial direction between 1 and 500 mm with a simultaneous generation of high energy densities in the range between 0.1 and 10 J/cm2). The period of the interference patterns can be set between 0.1 and 100 μm.

In accordance with the invention, the laser beam or the sample (preferably also both) can be moved. This allows a simultaneous structuring of a plurality of lens structures or dot structures into the sample surface (introducing several thousand line structures or dot structures simultaneously is easily possible).

Within the framework of the apparatus in accordance with the invention, laser systems can in particular also be used having high pulse frequencies (in the kilohertz range) with a simultaneously low pulse energy. Extremely high structuring speeds are possible (for instance, a square meter of sample surface can be structured in the range between some few seconds and around one minute). The processing speed can thus be multiplied in comparison with existing apparatus for interference structuring.

An apparatus in accordance with the invention can be realized in a very compact form; in particular an integration of the apparatus into an industrial robot system is thus possible.

The most varied materials and substances can be structured over a surface using the apparatus in accordance with the invention and the method in accordance with the invention. Tribological and mechanical uses of the structured samples are thus just as possible as, for example, optical or biological uses.

Figure 2:
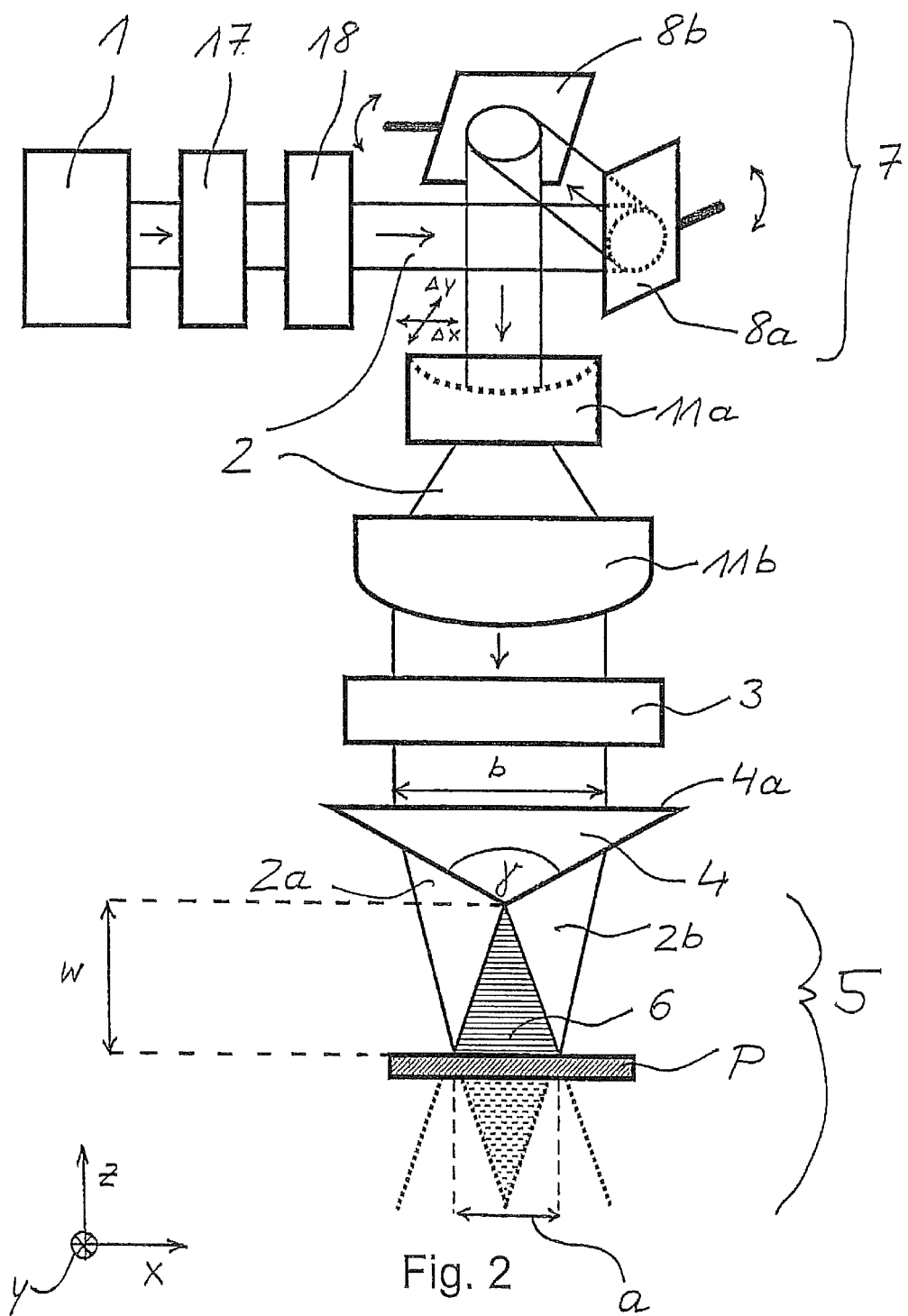
Figure 3:
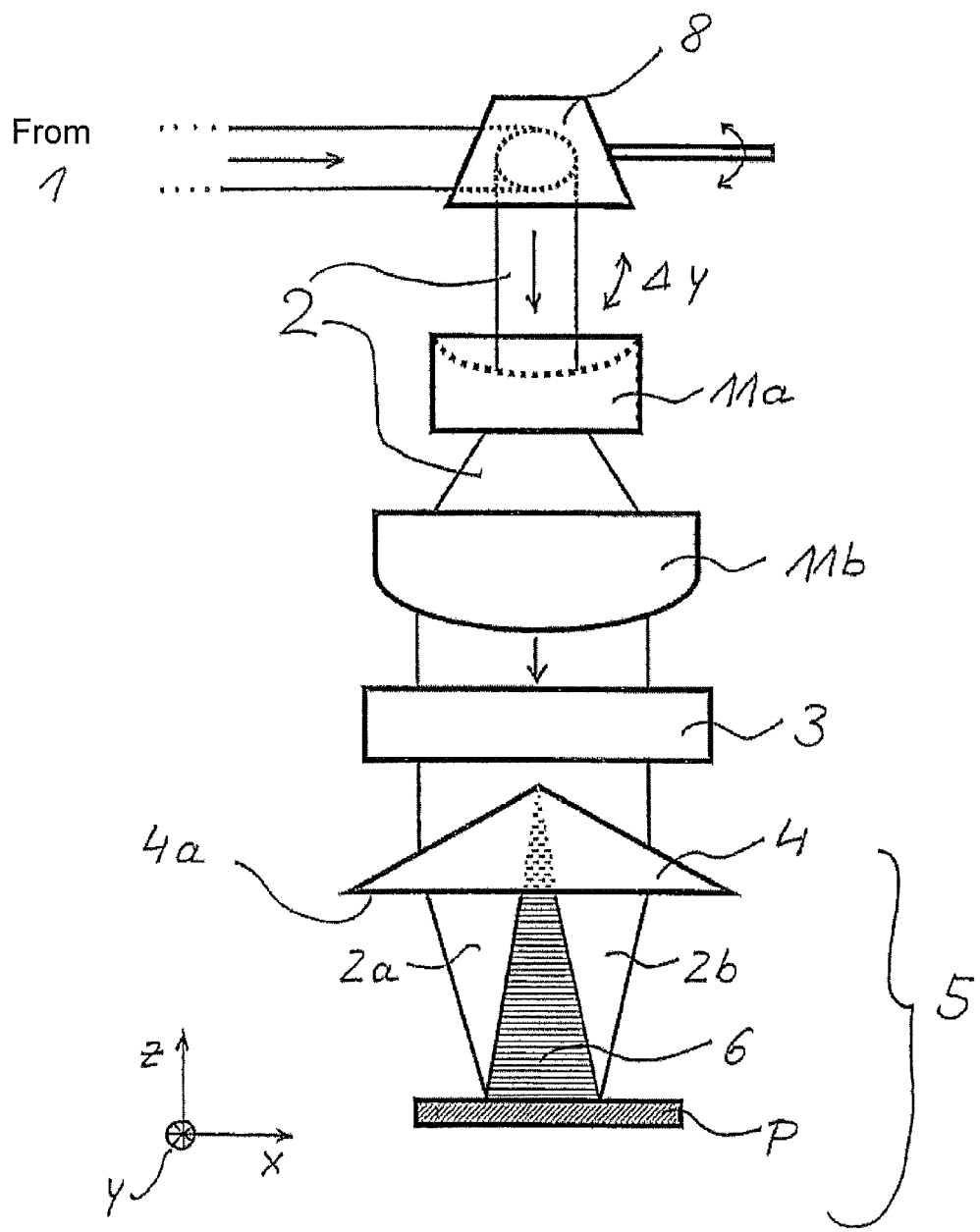
Figure 4:
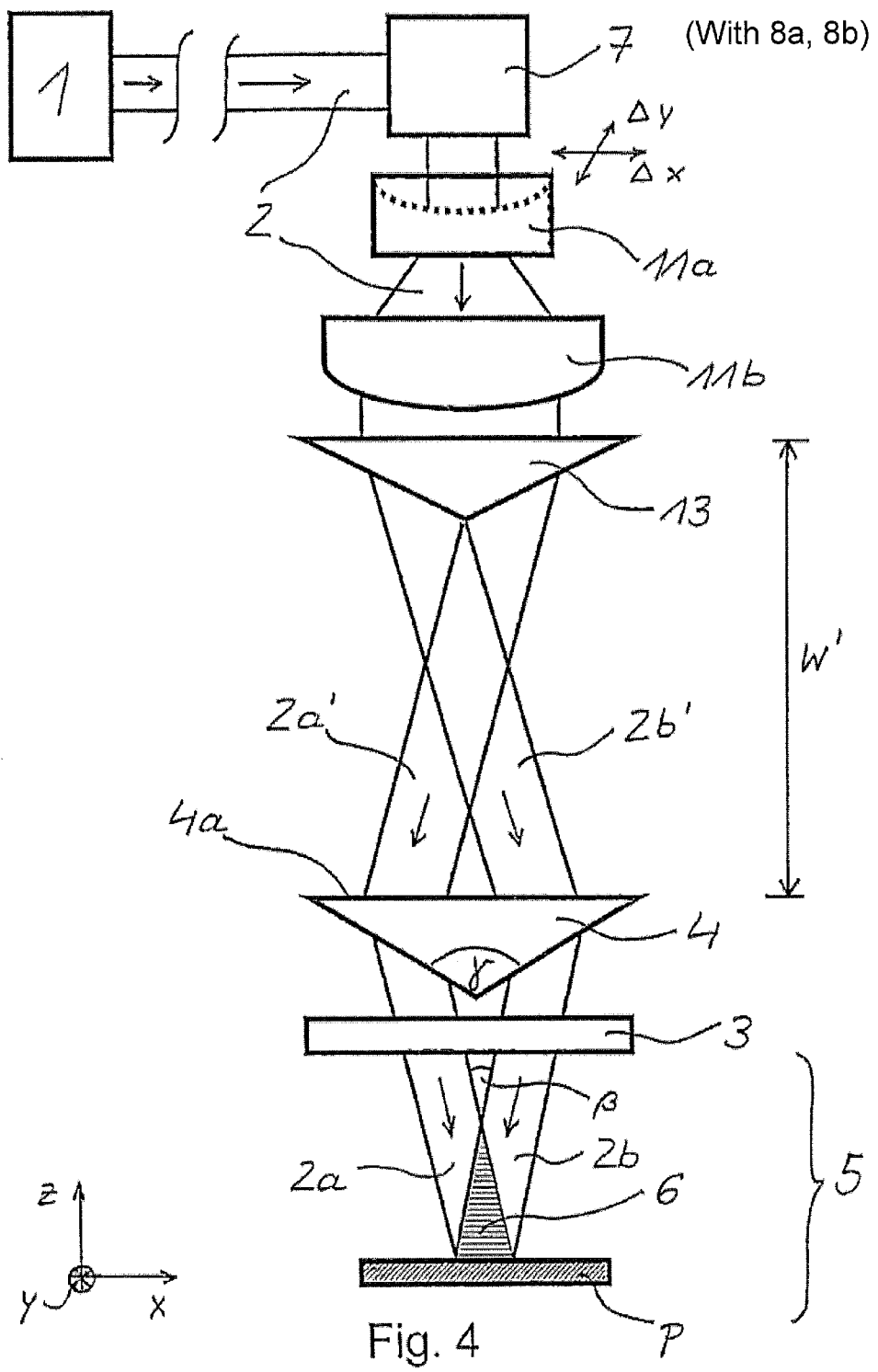
Figure 5:
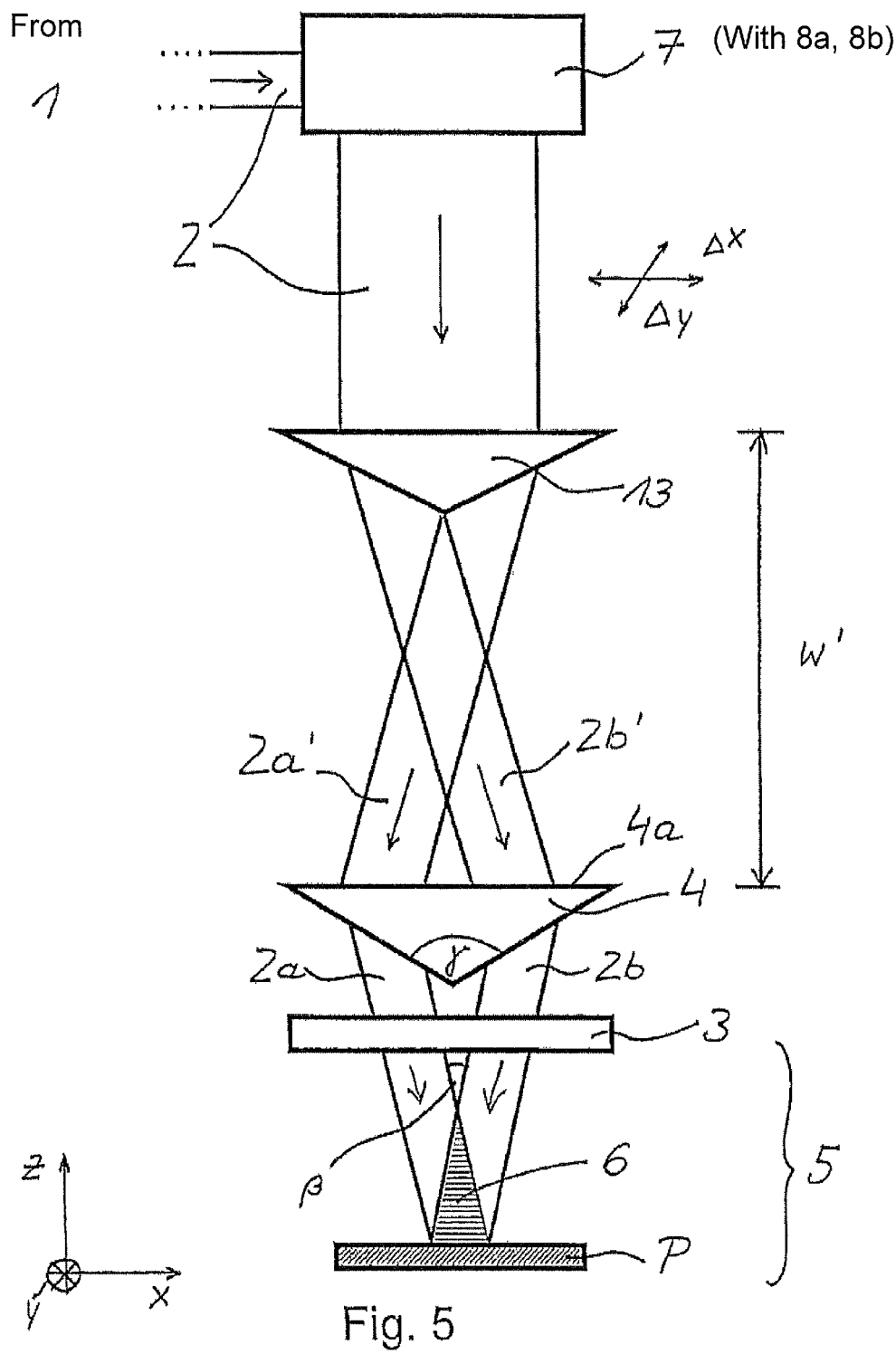
Figure 6A:
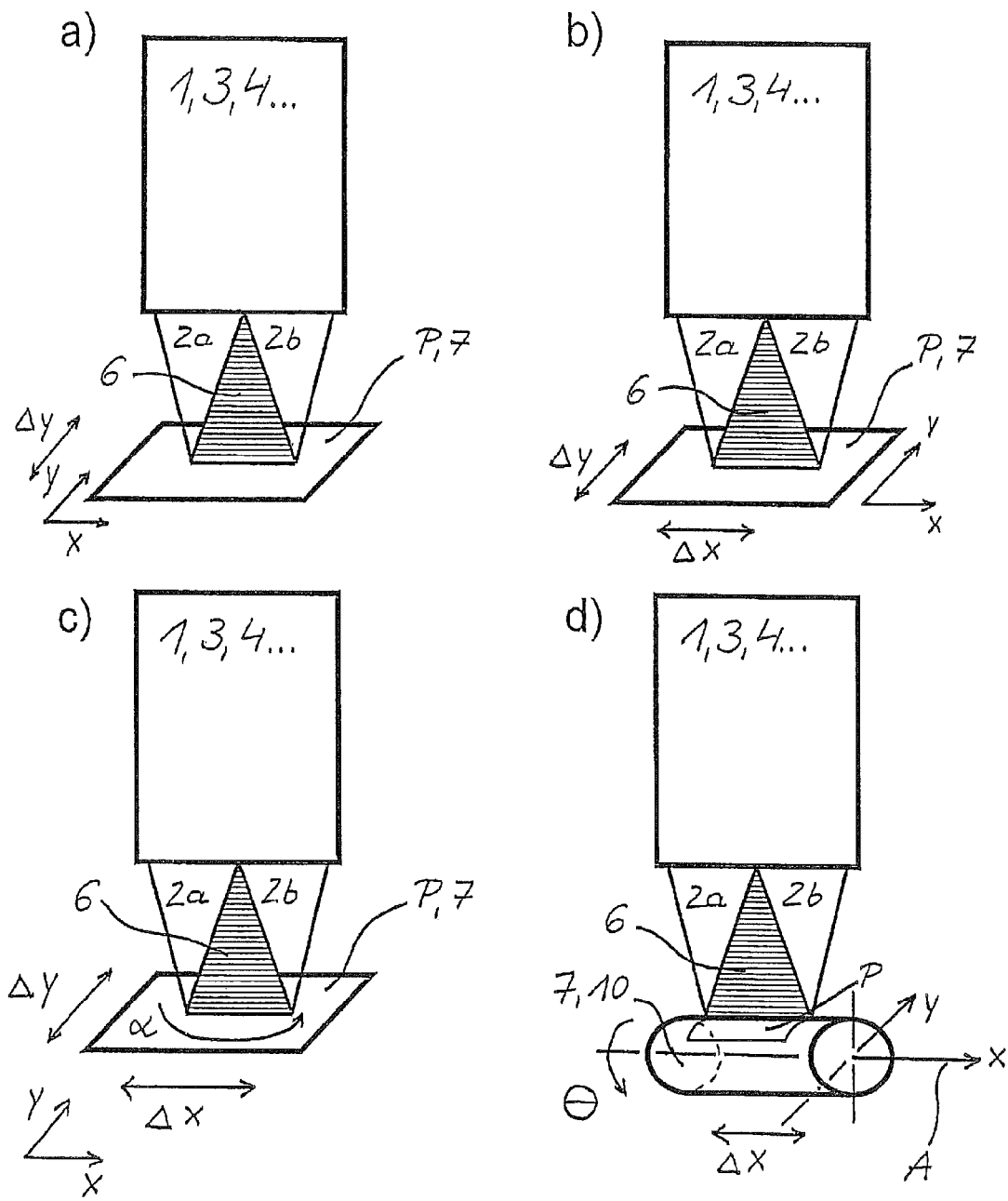
Figure 7:
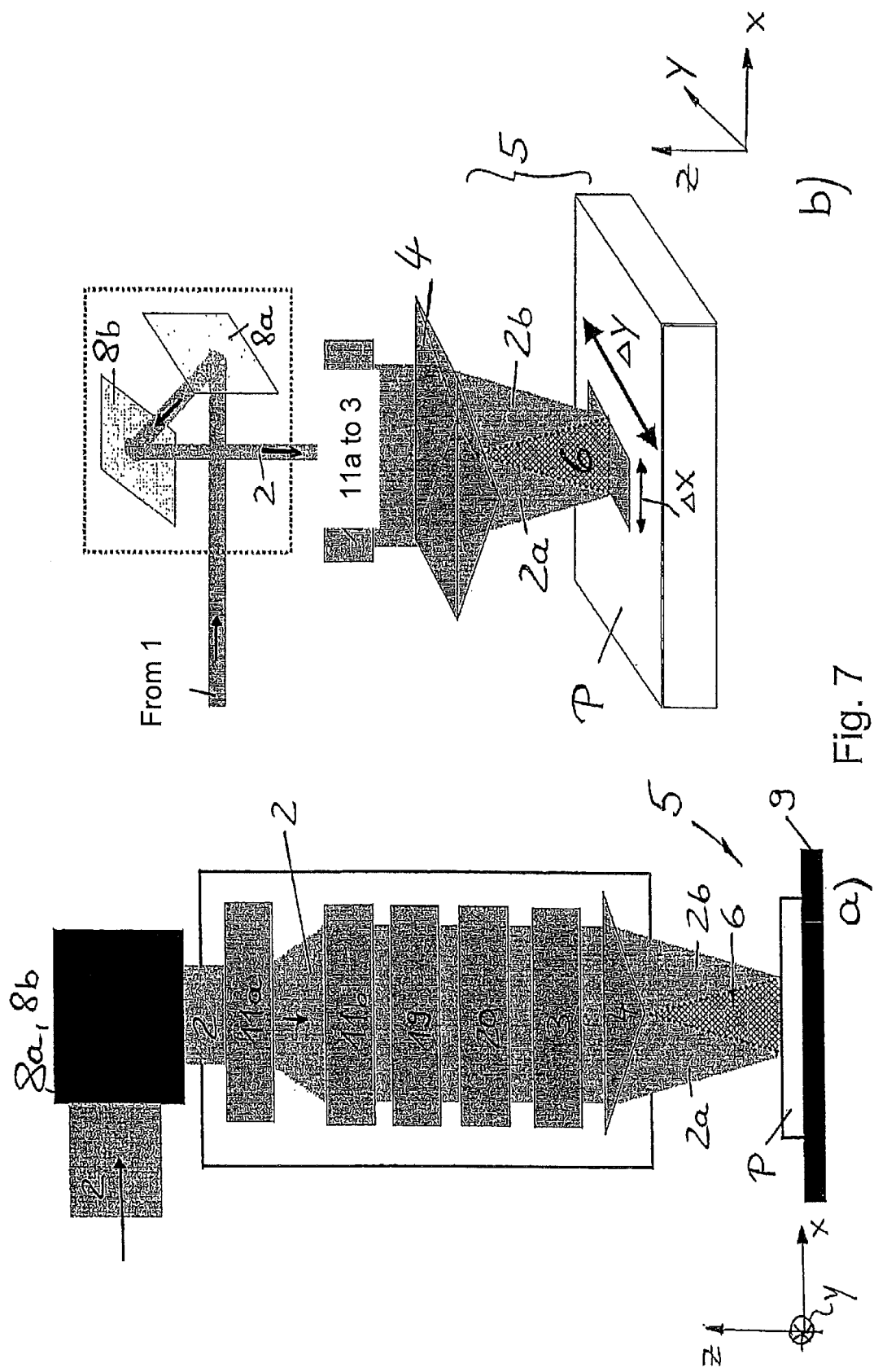
Figure 8A:
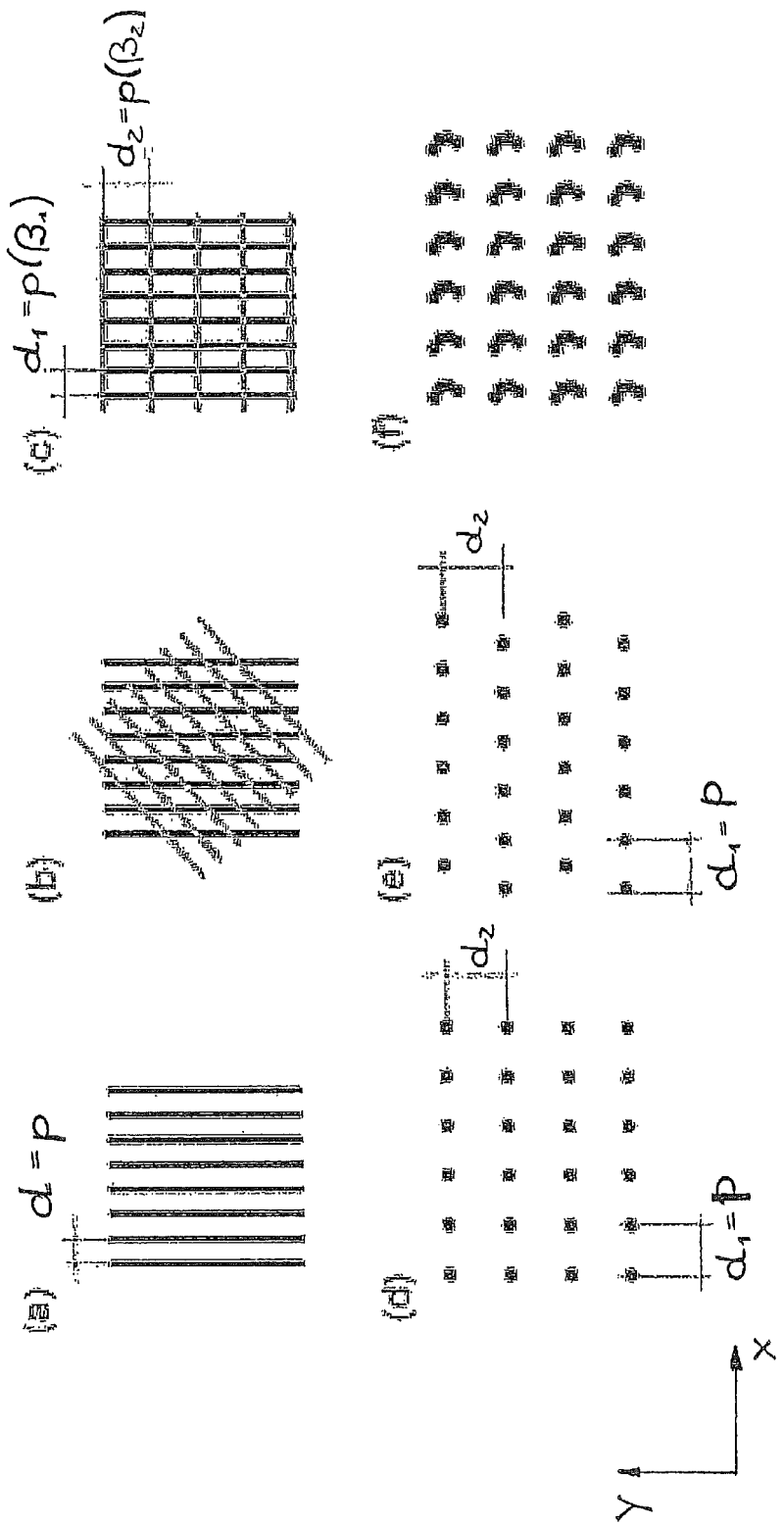
Figure 10:
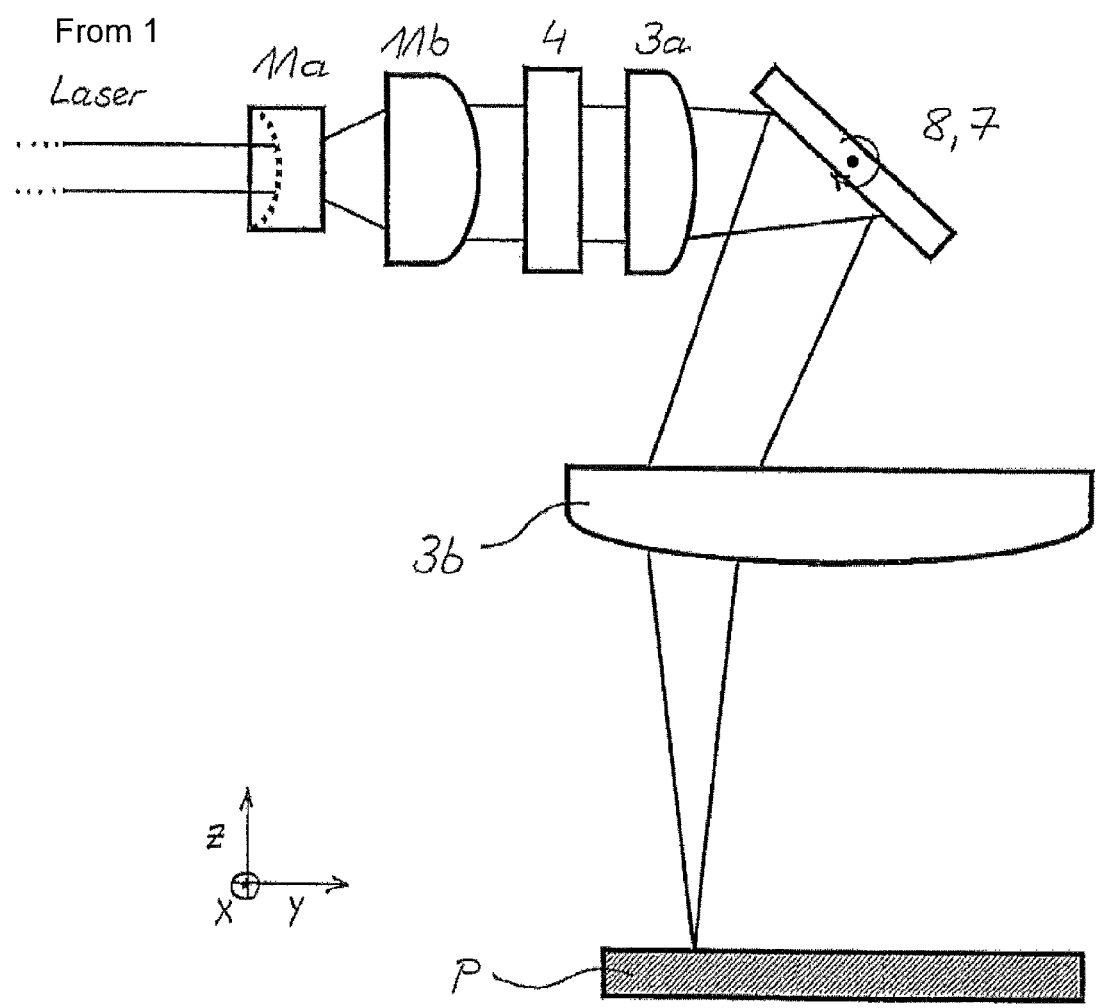

The present invention will be described in the following with reference to a plurality of embodiments. There are shown:

FIGS. 1a/1b a first apparatus in accordance with the invention for interference structuring;

FIG. 2 a second apparatus in accordance with the invention based on a galvanometer scanner;

FIG. 3 a third apparatus in accordance with the invention based on a galvanometer scanner only deflecting in one direction;

FIG. 4 a first apparatus in accordance with the invention which uses two biprisms in the beam path;

FIG. 5 a second apparatus in accordance with the invention which uses two biprisms in the beam path;

FIGS. 6a/6b a plurality of apparatus in accordance with the invention in which the movement unit moves the sample space or the sample arranged therein; as well as the integration of an apparatus in accordance with the invention into an industry robot;

FIG. 7 a particularly advantageous embodiment of the invention having a two-dimensional galvanometer scanner unit and an x-y table for moving the sample as a moving unit;

FIGS. 8a/8b several examples for recess structures in processed sample surfaces introduced by laser structuring processes in accordance with the invention;

FIG. 9 an example for laser parameters which can be selected within the framework of the invention and the processing speeds which can be achieved therewith;

FIG. 10 an example for a further apparatus in accordance with the invention in which the focusing element is formed in two parts, with a deflecting mirror rotatable by means of a galvanometer drive formed as a movement unit between the two parts of the focusing element.

FIGS. 1a and 1b show a first apparatus in accordance with the invention which is arranged in a fixed position in a global coordinate system (Cartesian coordinate system (x, y, z)). FIG. 1a, left, shows a plan view in the direction of the y axis (first spatial direction); FIG. 1a, right, shows a side view against the x axis (against the second spatial direction). If nothing is otherwise stated in the following, all of the optical elements in the beam path listed are arranged centered on the optical axis (however, this does not have to be the case). A fiber laser system having a pulse duration in the range between 1 femtosecond and 1000 microseconds, having a wavelength in the range between 150 nm and 13000 nm and having a pulse repetition rate in the range between 1 Hz and 200 MHz is used as a laser 1 (not shown here). It is in this respect preferably a fiber laser system having 20 ns pulse duration, a wavelength of 1064 nm and a repetition rate of 5 KHz.

A collimator 12 for generating a parallel laser beam having a diameter of 7 mm (double full width half maximum) is arranged first in the beam path of the laser 1. A concave lens 11a (e.g. having a focal length of −150 mm) follows first in the beam path after the collimator—viewed in the beam direction—and subsequently a beam expander 11 which comprises a convex lens 11b (e.g. having a focal length of 200 mm) and with which the beam width can be expanded in both spatial directions. The mean beam diameter (of the still parallel beam 2) after the beam expander 11 is 14 mm.

A square pinhole aperture (not shown) can be arranged in the beam path between the collimator 12 and the beam expander 11 and the round beam cross-section after the collimator 12 is converted by it into a square beam cross-section.

The beam 2 of the laser radiation widened in parallel is directed after the beam expander 11 to the focusing element 3 in the form of a cylindrical lens whose cylinder axis is arranged in the x direction.

The focal length of the cylindrical lens 3 is selected so that it coincides with the distance of the cylindrical lens 3 from a sample volume 5 or from a sample P (viewed along the optical axis or the Z axis of the structure). The laser radiation 2 is thus focused, viewed in the y direction, exactly on the surface of the sample P to be processed.

A biprism 4 is arranged in the beam path after the cylindrical lens 3 such that the surface 4a disposed opposite its obtuse angle γ is perpendicular to the optical axis of the structure and faces the focusing element 3. The angle γ here amounts to 170°. The two surfaces spanning the obtuse angle γ stand perpendicular on the x-z plane. The biprism is configured and arranged by a suitable choice of the angle γ such that the incident laser beam 2 is split by the biprism into two beams 2a and 2b which are superimposed—viewed in the direction of the second spatial direction x—at an angle β. Interference of the laser radiation 2 thus occurs in the overlap region of the two beams 2a, 2b (this superimposition region drawn with dashed lines here will therefore also be called an interference region 6 in the following).

A planar sample P (here a thin plastic plate) is positioned perpendicular to the optical axis of the apparatus shown within the sample volume 5 within the interference region 6. In the case shown, the region in which interference of the two partial beams 2a and 2b occurs (interference region 6) can thus be understood as a part of the sample volume 5 in which the sample P is arranged.

A local energy density can thus be produced in the intensity maxima of the interference at the sample surface by a suitable choice of the laser parameters (cf. above and FIG. 9) and by placing the sample P in the focal distance of the cylindrical lens 3, which local energy density is sufficient to locally vaporize material P and thus to introduce a depth structure into the plate surface P in accordance with the intensity pattern.

It follows from the law of refraction:

$$n4 \times \sin((180-\gamma)/2) = nair \times \sin(\beta)$$

where nair=1 (refractive index of air), n4=refractive index of the glass of the biprism 4 used (here: n=1.45 for a silicate glass biprism) and β (here: 7.2°) and γ (here 170°) the above-described angles. In the present case, in accordance with $$p = \frac{\lambda}{2 \times \sin(\beta/2)}$$

a value of 13.5 μm (at a wavelength of 1064 nm) results for the period p of the interference structure burned into the sample surface P (cf. FIG. 1b). The extent of the interference structure in the direction of the first spatial direction y resulting due to the focusing with the element 3 here amounts to 50 μm; the extent of the interference structure in the direction of the second spatial direction due to the mean beam width b (after the beam expansion) in the x direction x and the obtuse angle γ of the biprism 4 here amounts to 7 mm. The parameters b, γ, β and focal values of the cylindrical lens 3 as well as the spacings of the optical elements used in the beam path are set so that the maximum extent of the interference region 6 in the x direction occurs exactly in the focus of the lens 3.

The extent of the interference structure structuring the sample surface P in the y direction can easily be varied in the range of some micrometers up to some millimeters and can easily be varied in the x direction in the range of some millimeters to some centimeters by a corresponding variation of the focal length of the cylindrical lens 3, of the angle γ and/or of the beam width b. (The higher the beam width b is, the more individual maxima the interference structure has at the same period p: As the width b increases, the extent of the interference structure in the x direction thus increases).

The provision of a movement unit 7 which is formed in the shown embodiment as an x-y displacement table (on which the sample P is fixed and whose table surface is arranged in parallel to the x-y plane) is now essential for the present invention. This table is here designated by the reference numeral 9 and is arranged in the sample volume 5 as well as in the interference region 6. Alternatively to this, a rotary table on which the sample P is fixed and whose axis of rotation is arranged in the z direction (that is in parallel with the optical axis of the shown apparatus) can e.g. naturally also be used alternatively to this. The most varied one-dimensional or two-dimensional structures can be introduced into the surface of the sample P (cf. also FIGS. 8a and 8b) by a corresponding movement of the sample P in the sample space 5 (by a movement of the table 9) between the individual sequential laser pulses—in dependence on the specific choice of the feed speed or rotational speed of the table, on the pulse duration of a laser pulse and on the pulse repetition rate of the laser pulses. In this respect it is always important due to the focusing 3 in the y direction that the energy density in the maxima of the interference pattern 6 is sufficiently high to locally vaporize the material of the sample P.

Alternatively to the arrangement shown in FIG. 1a, it is also possible to arrange the focusing element 3—viewed in the beam direction 2—after the biprism 4 (cf. also FIG. 4: The breaking down of the expanded beam 2 into the two partial beams 2a and 2b then first takes place before a focusing of these two beam paths 2a, 2b is carried out in the direction of the first spatial direction).

It is also possible to achieve a beam expansion without using the beam expander 11 shown by a suitable choice of the distance of the fiber end of the laser 1 from the focusing element 3 (or from the first prim 4) and by the use of a suitably configured collimator lens.

FIG. 2 shows a further embodiment of the present invention in which the movement unit 7 is realized in a particularly advantageous manner based on a galvanometer scanner. The structure and arrangement of this apparatus are generally similar to the embodiment shown in FIG. 1 so that only the differences will be described in the following.

The shown apparatus has the following structure in the beam path before the beam expander 11 or its first lens 11a. A pulsed disk laser is used as the laser 1 so that a shutter 17 with which the individual laser pulses can be used first follows this laser in the beam path. A diaphragm 18 follows for setting a suitable (round here) beam cross-section before the laser radiation 2 is directed onto a galvanometer arrangement 7 comprising two movable mirrors 8a, 8b. The two mirrors 8a, 8b are each pivotably arranged about an axis of rotation in a manner known to the skilled person such that a deflection of the laser beam 2 in the direction of the first and/or second spatial directions can be effected by varying the angle settings of the two mirrors 8a, 8b. The angle setting and/or the positioning of the two beam deflection elements 8a, 8b can take place with the aid of a galvanometer drive known to the skilled person and not shown here.

The laser beam 2 can thus be tilted by the shown galvanometer scanner-based movement unit 7 by varying the mirror positions before said laser beam is incident on the first lens 11a of the beam expander 11 by any desired angle relative to the optical axis of the shown apparatus (or of the elements 11a, 11b, 3, 4, 5) or to the z direction. In other words, a very fast deflection of the laser beam 2 in the y direction and/or in the x direction (which is here marked by the designation Δy and Δx) takes place by the movement unit 7 in the present case. The laser beam 2 is thus incident with different angle(s) of incidence and/or position(s) of incidence on the surface of the concave lens 11a of the beam expander 11 facing the movement unit 7 in dependence on the instantaneous angle position of the two mirrors 8a, 8b, viewed in the x direction and/or y direction. A corresponding deflection thereby also takes place at the exit side of the elements 3, 4.

A deflection of the laser beam 2 (or of the partial beams 2a, 2b) in the global coordinate system (x, y, z) thus takes place in the present case (with a fixed sample volume 5 or a fixed sample P) by the galvanometer scanner-based movement unit 7 so that practically any desired structures can be introduced areally into the sample P by a suitable variation of the mirror positions.

As also in the embodiment shown in FIG. 1, the working distance w (distance between the obtuse-angle tip of the biprism 4 and the sample P viewed in the direction of the optical axis) is set so that the sample P is arranged exactly in the maximum overlap region of the two partial beams 2a, 2b. This allows the utilization of the maximum extent a of the interference region 6 in the x direction for structuring the sample surface. (The working distance w of the maximum interference range extent a from the obtuse tip γ of the prism 4 can be set via the beam width b in the x-direction: The larger b is, the larger w becomes).

FIG. 3 shows a further embodiment whose structure generally coincides with that shown in FIG. 2 so that again only the differences will be described in the following: Instead of a galvanometer scanner-based movement unit 7 deflecting the laser beam 2 in the two dimensions x and y, only a single movable mirror 8 is provided in the movement unit 7 here, with which mirror only a deflection Δy of the laser beam in the y direction can take place. Only the position of incidence and the angle of incidence of the laser beam 2 on the lens 11a in the y direction can thus be varied. Correspondingly, only a displacement of the interference pattern 6 in the y direction along the sample surface results (provided a displacement table for the sample P is not also provided).

As FIG. 3 shows, a converse arrangement (viewed in the direction of the optical axis) of the biprism 4 in the beam path after the focusing element 3 is moreover also possible. The planar surface 4a remote from the obtuse tip γ is here equally arranged in parallel with the x-y plane, but not facing the cylindrical lens 3, but rather the sample P. This has the disadvantage, however, that with too high an intensity of the laser radiation damage to the prism 4 may possibly occur due to the beam interference 2a, 2b (see dashed lines) already taking place within the biprism 4. As a rule, the arrangement of the biprism 4 shown in FIG. 2 is to be preferred.

FIG. 4 shows a further embodiment whose design generally corresponds to that of the embodiment of FIG. 2 so that only the differences will be described in the following. (The elements 1, 17, 18, 8a and 8b are not shown here for reasons of simplification; the first element in the beam path after the beam expander 11 is thus the second biprism 13, see in the following).

As FIG. 4 shows, the elements 3 and 4 can also be arranged in the direction of the optical axis so that first the two partial beams 2a, 2b are produced which are incident on or interfere 6 at the angle of incidence β relative to one another on the sample volume 5 before the focusing takes place in the first spatial direction y with the aid of the cylindrical lens 3.

The essential difference to the design shown in FIG. 2 is, however, that the laser radiation 2 which can be deflected both in the x direction and in the y direction by means of the two-dimensional galvanometer arrangement 7, 8a, 8b is deflected on the beam exit side of the beam expander 11 onto a further second prism 13 which is arranged between the elements 11 and 4 in the beam path (and is centered on the optical axis). The plane disposed opposite the obtuse angle of this biprism 13 also faces the beam expander 11, that is its tip faces in the direction of the sample P (as the first biprism 4). The laser radiation 2 is split into two beams 2a', 2b' by the second biprism 13 such that these two beams (viewed in the x direction) are completely separate from one another before they are incident on the planar surface 4a disposed opposite the obtuse angle γ of the first biprism. The first biprism 4 is arranged in this case such that the two already separated partial beams 2a' and 2b' incident at different angles are directed as beams 2a, 2b onto the sample volume 5 so that they interfere 6 as described above.

The arrangement shown in FIG. 4 with to biprisms 4, 13 has the advantage that the interference region 6 is formed at a greater distance from the first biprism 4 so that a larger working distance w results (cf. FIG. 2). The working distance w can be set in the direction of the optical axis via the distance w' of the two prisms 4, 13.

FIG. 5 shows a further embodiment whose apparatus is generally configured as the apparatus shown in FIG. 4, with here, however, the beam expander 11 disposed between the elements 7 and 13 being dispensed with.

FIG. 6a schematically shows which movement units 7 can be realized at the beam exit side of the focusing element 3 and of the first prism 4, that is for moving the sample and/or the sample volume 5 into the first and/or second spatial directions. As already described above, they can also be combined with galvanometer scanner-based movement unit components 8a, 8b, . . . on the beam path side of the elements 3, 4 so that both a movement of the sample volume or of the sample and of the laser radiation 2 is possible in a particularly advantageous manner. The movements of the galvanoscanner or of the galvanometer scanner-based components 8a, 8b, . . . and of the movement unit(s) on the beam exit side (e.g. x-y displacement table) can take place in a synchronized manner in this respect.

FIG. 6a-a) schematically shows the provision of a translation table 7 with which the sample P can only be moved in the y direction, that is only one-dimensional and two-dimensional pattern structures can be structured in the sample surface (see FIGS. 8a-a and 8a-d).

Figure 6B:
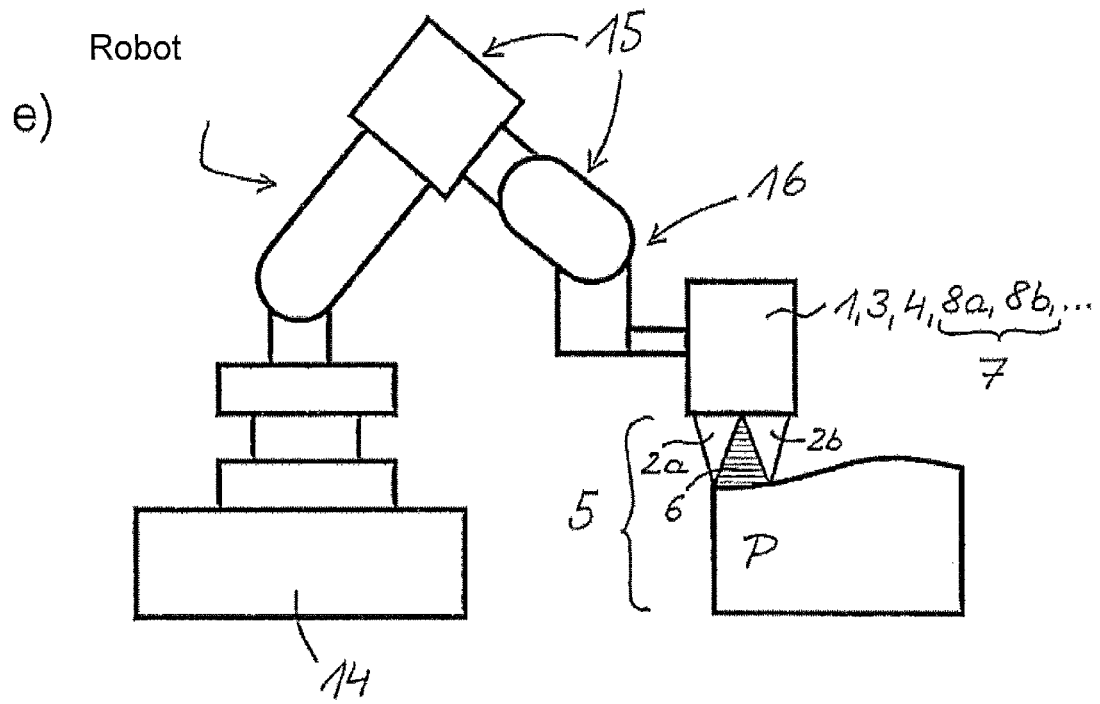
Figure 6B:
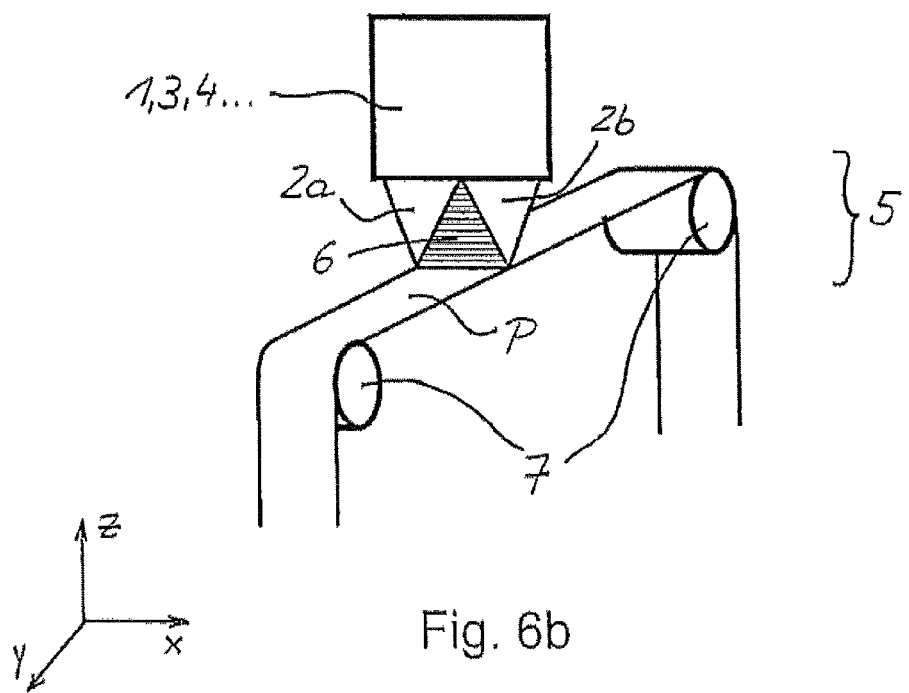

In the case outlined in FIG. 6a-b), a translation table is provided as a movement unit 7 with which the sample P can be moved both in the x direction and in the y direction so that two-dimensional pattern structures can also be produced.

FIG. 6a-c) shows the provision of a rotary table as a movement unit 7 whose axis of rotation stands perpendicular to the x-y plane and with which the sample P can thus be rotated about the optical axis in the direction a (see arrow). (The pattern structures shown, for example, in FIGS. 8b-v and 8b-vi) can thus be realized.)

FIG. 6a-d) finally shows a movement unit 7 configured as a rotating roll 10, with the axis of rotation A of this roll 10 being arranged in parallel with the x direction so that the surface of the roll is given a movement component in the y direction and/or in the z direction by rotation Θ about the axis of rotation A.

The sample P to be structured can be fixed on the jacket surface of the roll 10; it is then structured perpendicular to the x direction on a rotation of the roll about an angle θ.

As FIG. 6b-f) shows, the movement unit 7 can also be configured as a roller-to-roller transport unit at the beam exit side. The sample P is in this respect fixed areally on a transport belt which is transported sectionally in the y direction in parallel with the x-y plane. A one-dimensional structuring of the sample P in the y direction then takes place.

As FIG. 6b-e) shows, an industrial robot can also be realized in accordance with the invention for the interference structuring. The robot has a base frame 14 which is arranged at a fixed position in the global coordinate system and at which the kinematic chain 15 of the robot comprising a plurality of links is fastened so that the end 16 of this kinematic chain remote from the base frame can be moved in space in translation and in rotation relative to the global coordinate system. An apparatus of the apparatus for interference structuring shown in the above-described embodiments can be rigidly connected to this end 16 of the kinematic chain 15 of the robot.

In this respect, the use of a fiber-based laser 1 is particularly advantageous; the beam guidance then takes place via a fiber suitably formed in the kinematic chain.

The arrangement shown is in this respect advantageously operated so that the apparatus for interference structuring rigidly fixed at the end 16 is first aligned as desired relative to the sample P to be processed by a movement of the kinematic chain 15. The sample P and the apparatus for interference structuring are then immovable relative to one another in an exactly defined position after this alignment so that subsequently the coordinate system (x, y, z) of the apparatus for interference structuring coincides with the global coordinate system. The structuring of the sample P then takes place as described in the preceding embodiments.

FIG. 7 finally outlines a particularly advantageous embodiment of the present invention in which the movement unit 7 connects a plurality of beam deflection elements 8a, 8b at the beam entry side having a galvanometer drive to a displacement table 9 which is arranged at the beam exit side and on which the sample P is displaceably arranged in the x direction and in the y direction in the sample volume or in the interference region 6. The design thus generally corresponds to the case shown in FIG. 2 (with here additionally the displacement table 9 being present at the beam exit side) so that only the differences will be described in the following.

An additional lens system 19, 20 is here arranged between the beam expander 11a, 11b and the cylindrical lens 3 in the beam path 2.

Different samples P of polymer materials, ceramic materials, metal or also plastic can be given an interference structure using the apparatus shown in FIG. 7.

FIG. 8a shows different interference structures (also called patterns in the following) which can be introduced into different materials or samples P (metal, ceramics, polymers, . . . ) by the above-described apparatus in accordance with the invention.

One-dimensional, linear patterns with a periodic distance d (corresponding to the pattern period p of FIG. 1b), cf. (a).

Cruciform, one-dimensional patterns which are achieved by multi-irradiation procedures (after rotation of the sample) from linear patterns in accordance with (a). In this respect, any desired rotational angles (e.g. 30°, 60° or 90°) of the sample P are possible, cf. (b).

Combined cruciform patterns having different linear distances which can be achieved by varying the wavelengths $\lambda$ (for example on the basis of an optically parametric oscillator (OPO) of the laser 1) and/or by varying the angle $\beta$ cf. (c).

Different arrangements of recesses (holes) having different distances d1 and d2, where d1 or d2 corresponds to the period p of the interference structure, see (d), (e) and (f). For example in the case (d), the hole distance d1 in the x direction can thus correspond to the period of the interference structure p (cf. FIG. 1b), while the distance of the structure holes in the y direction (that is d2) can be set by deflection of the laser beam in the y direction via a mirror 8, as is shown in FIG. 3 (the distance d2 is in this respect determined by the geometrical arrangement of the individual elements, the movement speed of the mirror 8 and the pulse repetition rate of the laser pulses).

Figure 8B:
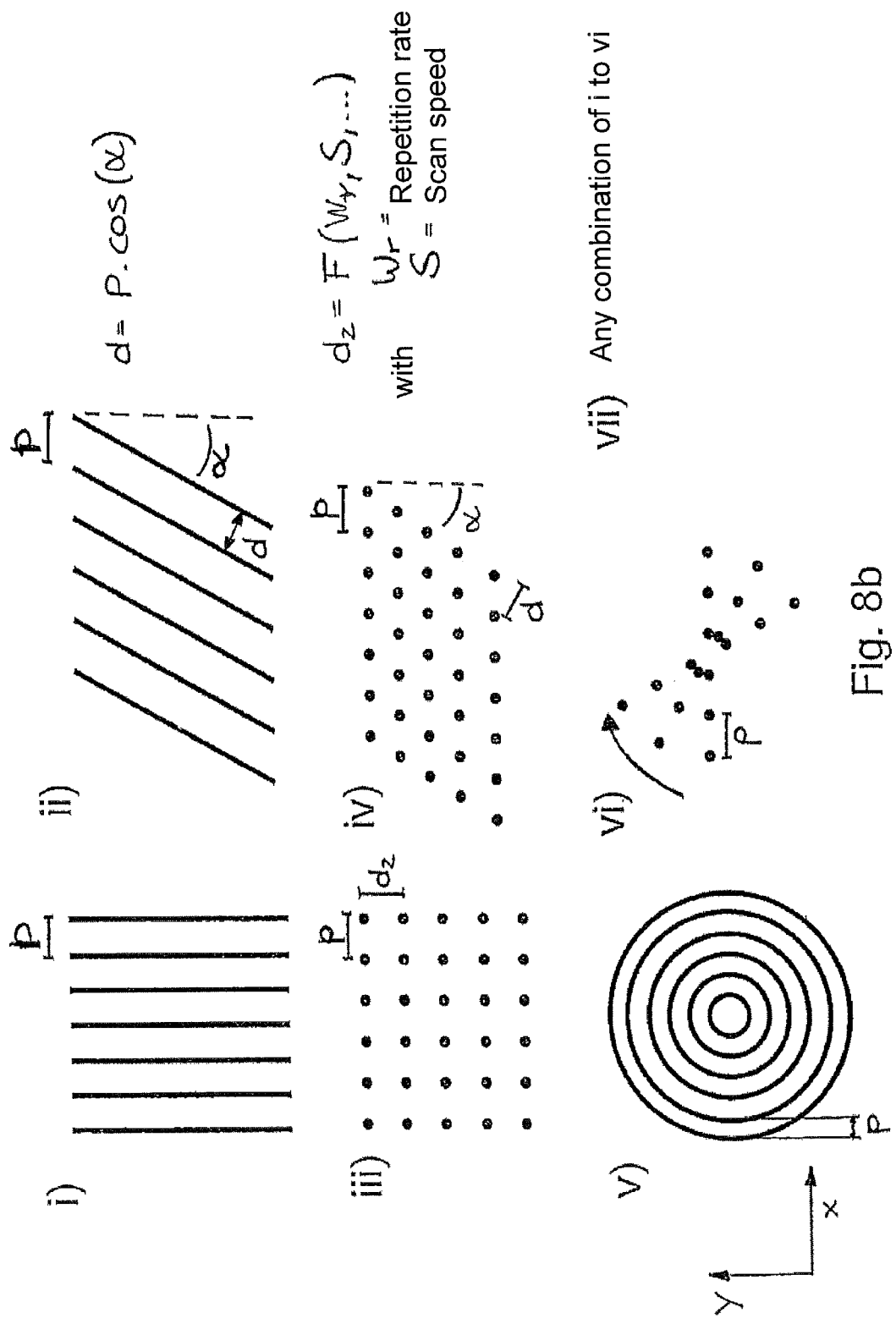

FIG. 8b shows further structuring examples (i) to (vi) which are possible in accordance with the invention. At (i) the setting of the period p of the interference structure in the x direction thus takes place via the angle $\beta$ (that is via the prism shape or a suitable choice of the angle $\gamma$ of the prism), with the laser being continuously operated and e.g. a continuous displacement of the sample P taking place with the help of a translation table during the processing in the y direction. In the case (ii) the sample displacement additionally takes place with an x component (d is here the perpendicular distance of adjacent structuring lines; the angle $\alpha$ results from the relationship of the table displacement speeds in the x and y directions). The cases (iii) and (iv) were structured accordingly; however, here with a pulsed fiber laser. (The structuring hole distance in the y direction in this respect depends on the repetition rate wr of the pulses and on the scan speed s of the galvanometer based deflection in the y direction and on the geometrical arrangement). The cases (v) and (vi) outline the processing on the use of a rotary table instead of a translational table (cf. also FIG. 1a) in the case of the use of pulsed laser radiation with different rotational speeds: (v) very slow, (vi) faster. Combinations—(viii) of the shown processing variants are naturally also possible.

The pulse duration can amount to between one femtosecond and 500 milliseconds; the laser systems can have wavelengths from the UV range, the VIS range or the IR range (for example 266, 355, 532 or 1064 nm). Pulse repetition rates of a few Hertz up to 200 MHz are conceivable.

If a fiber laser is used having a power of 500 watts, a pulse duration of 20 ns, a pulse repetition rate of wr=10 kHz, a pulse energy of 50 mJ and a wavelength of $\lambda$=1064 nm, an extent of the interference pattern in the y direction of 200 µm, an extent in the x direction of 10 mm and a period (spacing of adjacent intensity maxima) of p=15 µm can be generated with a suitable configuration and arrangement of the optical elements in the beam path. The surface structured with a pulse thus amounts to approx. 0.02 cm2, which corresponds to a fluence of 2.5 J/cm2 at 50 mJ pulse energy. If a gap-free setting of single pulse structures (each 200 µm long) next to one another is desired, viewed in the y direction (that is an efficient structuring of the sample surface without overlap of the structures introduced by pulses directly following one another in time), the required deflection speed in the y direction results in accordance with 200 µm×10 kHz at 2 m/s. Such a structuring speed can particularly advantageously be realized by the galvanometer-based structures shown in FIG. 2 and FIG. 3 since in this case only a mirror movement is necessary, but not the movement of larger masses as with displacement table-based movement units.

FIG. 9 shows corresponding examples, with here the extent of the interference structure in the x-y plane (FIG. 1b) being called "focal size". The quoted scan speeds of the galvanometer control at the position of the sample P are in turn given without overlap (and with recess structures of laser pulses adjacent in time introduced directly adjacent to one another).

FIG. 10 shows a further embodiment of an apparatus in accordance with the invention in which the focusing element 3 is formed in two parts and in which the movement unit 7 has single mirror (beam deflection element 8) which is rotatable with the help of a galvanometer drive and which is arranged between the two parts 3a, 3b of the focusing element.

A two-part beam expander 11a, 11b (which is configured and arranged as the beam expander shown in FIG. 1) is realized in the beam path after the laser 1. The biprism 4 (whose surface 4a—not shown here—disposed opposite the obtuse angle is directed toward the laser) is arranged after the beam expander 11a, 11b in the beam path. The first part 3a of the focusing element, which is configured as a cylindrical lens, follows after the biprism 4 in the beam path. The cylindrical lens 3a focuses the laser radiation (in a similar manner as shown in FIG. 1a) in a first spatial direction (this indication of the first spatial direction here relates to the laser radiation after the reflection at the beam deflection element 8—see in the following—so that here as in the case shown in FIG. 1a a focusing also takes place in the y direction, relative to the sample plane, with this corresponding to a focusing in the z direction before the beam deflection by the element 8).

The movement unit 7, which is here formed as a single, pivotable or rotatable mirror 8 whose pivot axis or axis of rotation is in the direction of the second spatial direction (x direction), follows after the first part 3a of the focusing element 3 in the beam path. The second part of the focusing element 3, which is here configured as an F-theta objective, follows in the beam path after the movement unit. This objective 3b has a sufficient size and an arrangement such that the rotatable mirror 8 directs the laser beam over a large angular region onto the rear side of the objective 3b remote from the sample P and such that the objective 3b always ensures over the total angular region thus swept over by means of the mirror 8 that the laser beam is focused in the sample volume onto the sample P arranged there or on its surface to be structured (independently of the path of the laser beam between the laser and the sample P dependent on the instantaneous angular position).

The focusing element is thus configured in two parts 3a, 3b here, with the movement unit 7 being located (viewed in the beam path) between the two parts. The second part 3b arranged at the beam exit side of the movement unit 7 or the F-theta objective (which can be realized as a cylindrical, telecentric or cylindrically telecentric F-theta objective) thus holds the laser beam focus over the total scannable region (scan field) in one and the same plane, namely the surface of the sample P.

If the F-theta objective 3b is cylindrical or cylindrically telecentric, it can also take over the focusing of the laser radiation in the first spatial direction with a suitable setting. The cylindrical lens 3a can then be omitted. (An F-theta objective holds the laser beam focus in one plane in the total scan field. These objectives are therefore also called planar field optics. A telecentric F-theta objective also holds the laser beam focus in one plane in the total scan field. It still holds the laser beam perpendicular to the scan field.)

It can be necessary in this respect to monitor the width of the beam on the incidence side of the objective 3b (in the y direction) so that the objective 3b is not destroyed.

The utilization of one-dimensional lenses (concave lens 11a and concave lens 11b) would also alternatively be of advantage in the design shown in FIG. 10, that is of lenses which only influence the beam path (beam expansion) in the second spatial direction x (not shown here).

The invention claimed is:

1. An apparatus for the interference structuring of a planar sample, the apparatus comprising:
   a laser;
   a single-part or multipart focusing element that is arranged in a beam path of the laser and with which laser radiation can be focused in a first spatial direction;
   a first prism, in particular a biprism, which is arranged in the beam path of the laser and with which the laser radiation in a second spatial direction can be directed into one or more beams of laser radiation onto a sample volume such that the one or more beams of laser radiation interfere within the sample volume in an interference region, wherein the planar sample can be positioned or is positioned in the interference region; and
   a movement unit configured to perform at least one of moving the one or more beams of the laser radiation and moving the planar sample can be moved in the sample volume.

2. The apparatus in accordance with claim 1 wherein the focusing element is a cylindrical lens, a cylindrical lens having an F-theta objective arranged after it in the beam path, or is a cylindrical F-theta objective; or
   the focusing element is configured such that the focus of the laser radiation can be held over a region scannable by means of the movement unit, in exactly one plane within the sample volume.

3. The apparatus in accordance with claim 1, wherein the movement unit comprises one or more movable beam deflection elements that are arranged in the beam path of the laser, wherein the one or more movable beam deflection elements are at least one of rotatable and pivotable, and with which the one or more beams of the laser radiation can be moved in the first spatial direction, in the second spatial direction, or in the first and second spatial directions.

4. The apparatus in accordance with claim 3,
   wherein the one or more beam deflection elements can be positioned or angle-adjusted by means of a galvanometer drive; or
   the one or more beam deflection elements are arranged after the laser, before the focusing element, and before the first prism in the beam path and can be controlled such that the angle of incidence or the position of incidence of the beam path of the focusing element or the first prism following the beam deflection elements in the beam path can be varied.

5. The apparatus in accordance with claim 1, wherein the movement unit has a movable displacement unit with which the sample can be displaced in translation or in rotation in the sample volume in a plane of the first and second spatial directions,
   wherein the displacement unit is preferably configured so that the sample in the sample volume can be displaced by it perpendicular to the plane.

6. The apparatus in accordance with claim 1, wherein the movement unit has a rotatable rotation unit with which the sample can be rotated in the sample volume about an axis.

7. The apparatus in accordance with claim 1, wherein the focusing element is arranged before the first prism in the beam path of the laser; or
   the focusing element is arranged after the first prism in the beam path of the laser.

8. The apparatus in accordance with claim 1, wherein a beam expander is arranged in the beam path of the laser before the first prism or before the one or more beam deflection elements, with which beam expander the extent of the one or more beams of the laser radiation can be expanded only; or
   a collimator is arranged in the beam path before the focusing element, before the first prism, or before the beam expander or the one or more beam deflection elements.

9. The apparatus in accordance with claim 1, further comprising a second prism arranged before the first prism in the beam path of the laser, with which second prism the laser radiation can be split into two second beams that are at least partially separated from one another before two second beams are incident on the first prism and can be brought by the latter to interference in the sample volume.

10. The apparatus in accordance with claim 9,
    wherein the second prism is arranged before the first prism and the first prism is arranged before the focusing element in the beam path of the laser; or
    the second prism is arranged before the focusing element and the focusing element is arranged before the first prism in the beam path of the laser.

11. The apparatus in accordance with claim 1, wherein the laser;
   is a pulsed laser;
   generates pulses having a pulse duration of larger than or equal to 0.01 ns and less than or equal to 1000 ns;
   generates pulses having a pulse repetition rate of larger than or equal to 1 Hz and less than or equal to 100 MHz; or
   has a wavelength in the IR range, in the UV range, or in the visible range.

12. The apparatus in accordance with claim 1, wherein one or more of the following elements are arranged in the beam path of the laser:
   a frequency multiplier;
   an acousto-optical modulator;
   a mechanical shutter;
   a beam homogenizer configured for producing an intensity profile substantially constant over the beam cross-section; and
   a polarizer.

13. An arrangement for the interference structuring, the arrangement comprising:
   a base arranged at a fixed position in the global coordinate system; and
   a kinematic unit connected to the base and movable with one of its ends relative to the base,
   wherein an apparatus in accordance with claim 1 is fixed at the movable end of the kinematic unit.

14. A method for the interference structuring of a planar sample, wherein the structuring of the planar sample takes place by use of an apparatus or of an arrangement in accordance with claim 1.

15. The apparatus in accordance with claim 1, wherein the first prism comprises a biprism.

16. The apparatus in accordance with claim 1, wherein the second spatial direction is orthogonal to the first spatial direction.

17. The apparatus in accordance with claim 1, wherein the movement unit can move the one or more beams of the laser radiation in the first spatial direction, in the second spatial direction, or in the first and second spatial directions or the movement unit can move the planar sample in the sample volume in the first spatial direction, in the second spatial direction, or in the first and second spatial directions.

18. The apparatus in accordance with claim 3, wherein the one or more movable beam deflection elements comprise at least one of one or more mirrors and one or more reflective prisms.

19. The apparatus in accordance with claim 8, wherein the beam expander can expand the one or more beams of the laser radiation in the second spatial direction, but not in the first spatial direction, and can expand the one or more beams in parallel.

* * * * *